United States Patent [19]

Hjertholm

[11] Patent Number: 5,658,018
[45] Date of Patent: Aug. 19, 1997

[54] SEALING CONNECTION SYSTEM BETWEEN AXIALLY IMPACTING JOINT COMPONENTS

[75] Inventor: Ole Hjertholm, Lepsøy, Norway

[73] Assignee: Framo Engineering A/S, Nesttun, Norway

[21] Appl. No.: 596,264

[22] PCT Filed: Dec. 13, 1993

[86] PCT No.: PCT/NO93/00189

§ 371 Date: Feb. 8, 1996

§ 102(e) Date: Feb. 8, 1996

[87] PCT Pub. No.: WO95/07431

PCT Pub. Date: Mar. 16, 1995

[30] Foreign Application Priority Data

Sep. 9, 1993 [NO] Norway ............................ 933211

[51] Int. Cl.⁶ .................................................. F16L 37/18
[52] U.S. Cl. .................................... 285/18; 285/315
[58] Field of Search ....................... 285/315, 18, 316, 285/320, 314

[56] References Cited

U.S. PATENT DOCUMENTS

| | | | |
|---|---|---|---|
| 3,325,190 | 6/1967 | Eckert et al. | 285/315 |
| 3,510,153 | 5/1970 | Newton | 285/315 |
| 3,558,160 | 1/1971 | Falkner | 285/18 |
| 3,841,665 | 10/1974 | Capot | 285/2 |
| 4,195,865 | 4/1980 | Martin | 285/18 |
| 4,411,317 | 10/1983 | Gieswein | 166/347 |
| 4,516,795 | 5/1985 | Baugh | 285/320 |
| 4,593,937 | 6/1986 | Schawann et al. | 285/315 |
| 4,693,497 | 9/1987 | Peitus et al. | 285/315 |
| 4,708,376 | 11/1987 | Jennings et al. | 285/315 |
| 4,730,853 | 3/1988 | Gjessing | 285/315 |
| 5,181,730 | 1/1993 | Hjertholm | 285/917 |
| 5,441,311 | 8/1995 | Watkins | 285/315 |

FOREIGN PATENT DOCUMENTS

| | | | |
|---|---|---|---|
| 2023355 | 8/1970 | France. | |
| 1911745 | 10/1969 | Germany. | |
| 1362093 | 7/1974 | United Kingdom. | |
| 2004341 | 3/1979 | United Kingdom | 285/315 |
| 2182744 | 5/1987 | United Kingdom. | |
| 2235512 | 3/1991 | United Kingdom | 285/315 |

*Primary Examiner*—Eric K. Nicholson
*Attorney, Agent, or Firm*—McAulay Fisher Nissen Goldberg & Kiel, LLP

[57] ABSTRACT

Two joint components in a pipe conduit are secured together in seal-tight fashion by means of rotatably mounted dogs in one of the joint components which are rotated via individual slides into an active locking position. The slides are, in turn, activated from a common pressure source. In addition, a wedge is positioned in the joint component under a housing in which a dog is rotatably mounted so as to be slid radially inward by a slide after the dog has been rotated into a locking position. In one embodiment, a double acting piston and cylinder arrangement is used for actuating the respective slides.

20 Claims, 11 Drawing Sheets

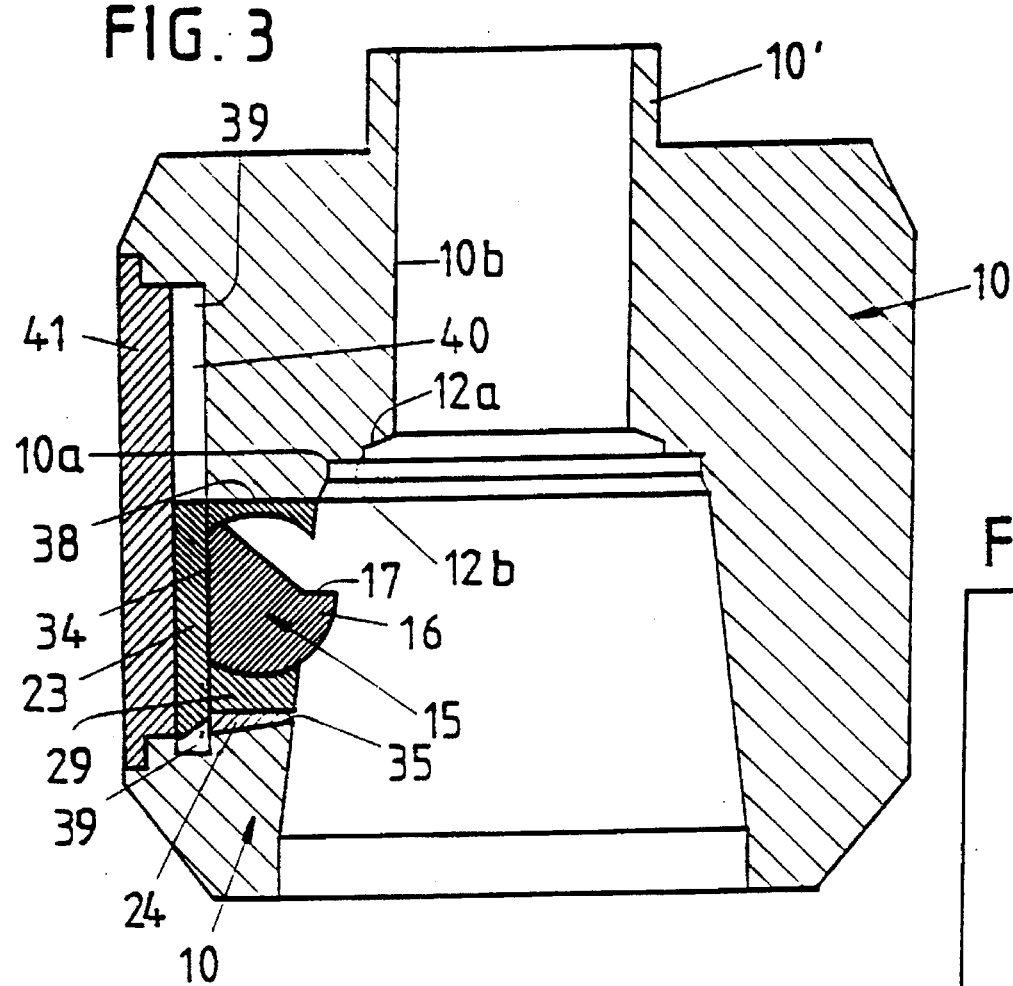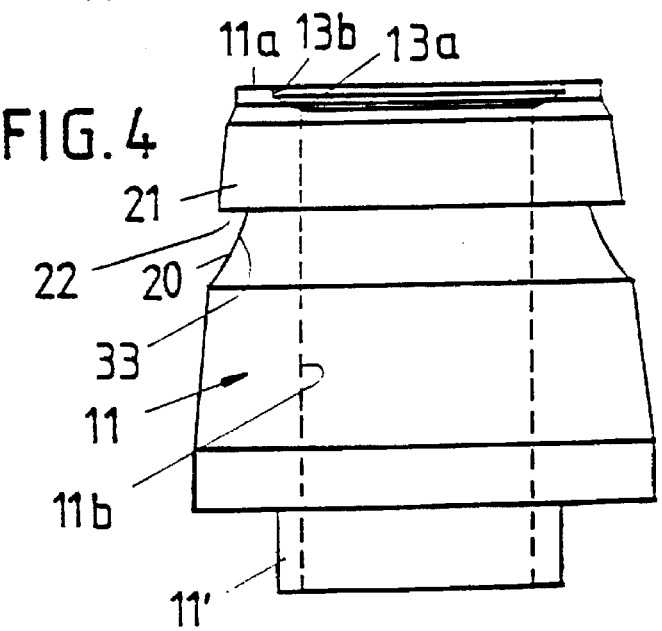

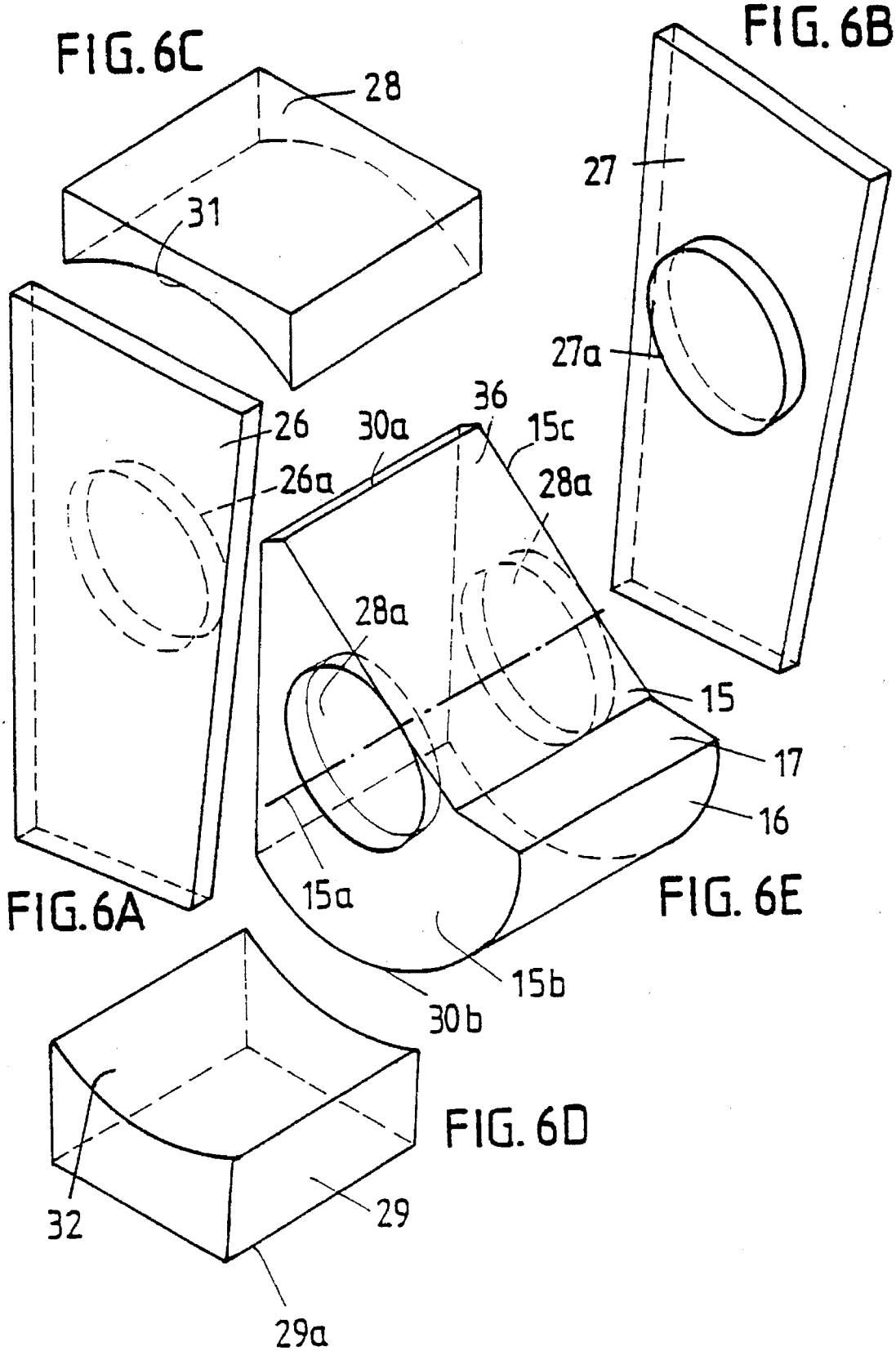

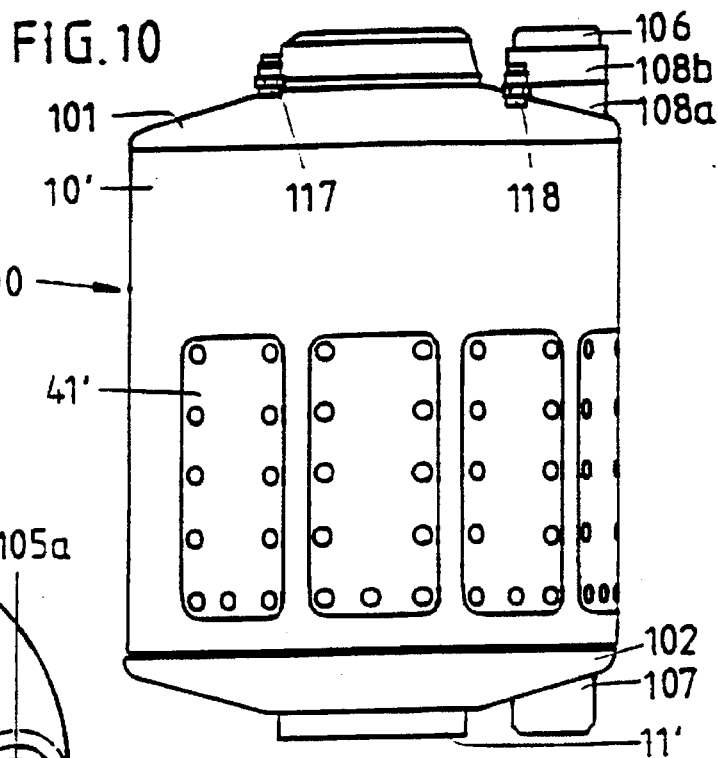
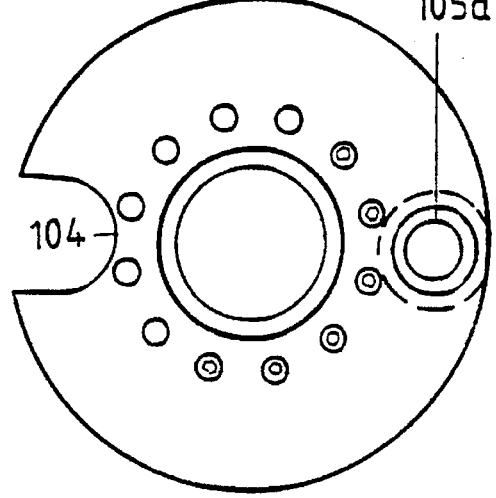
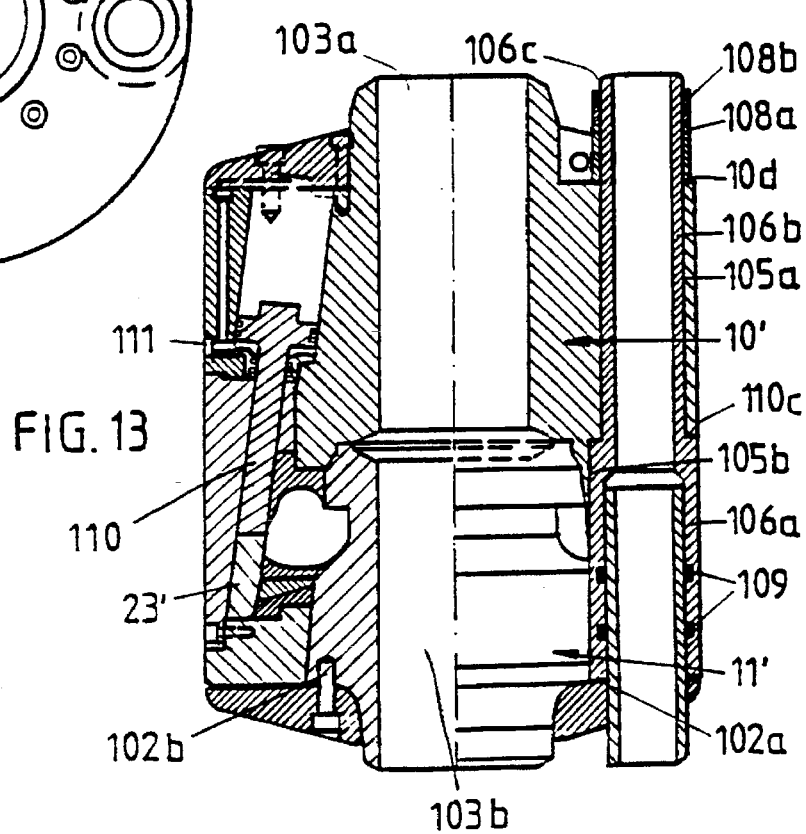

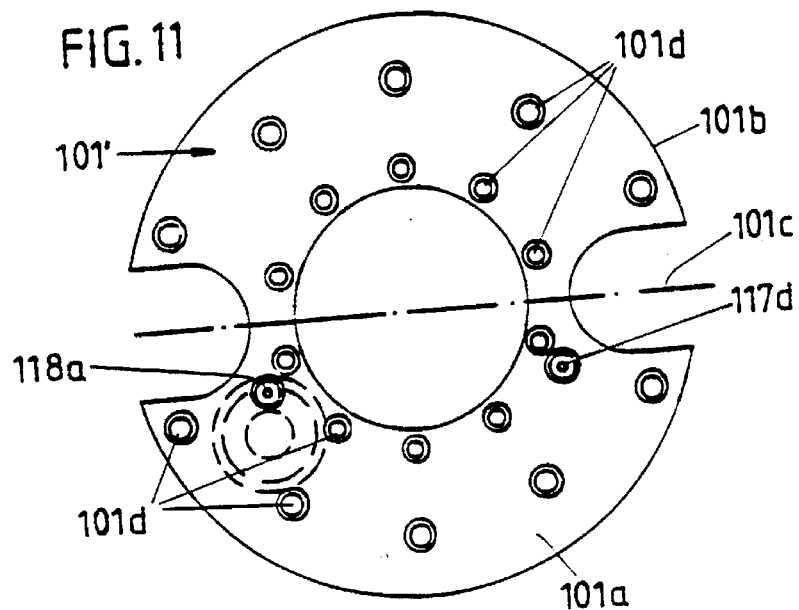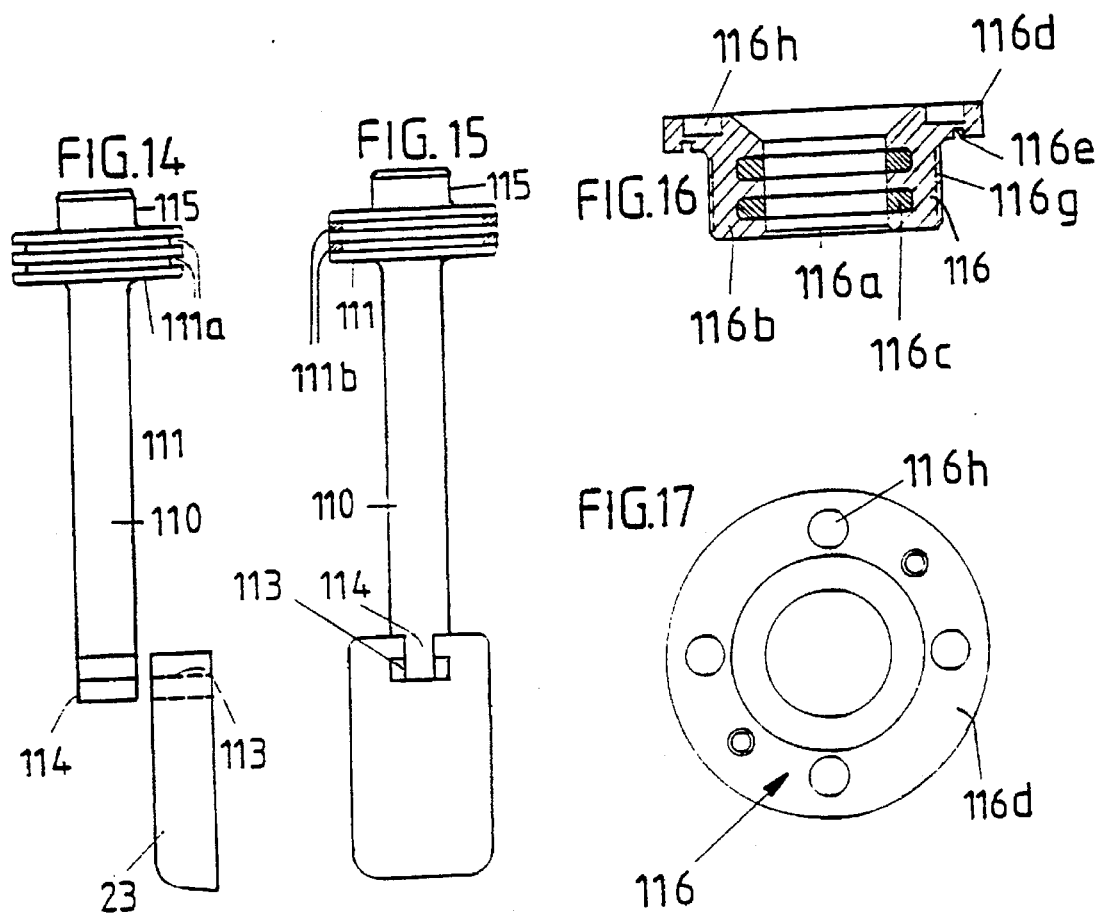

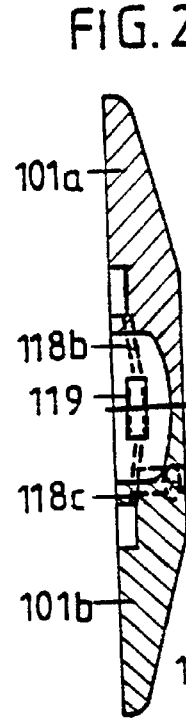
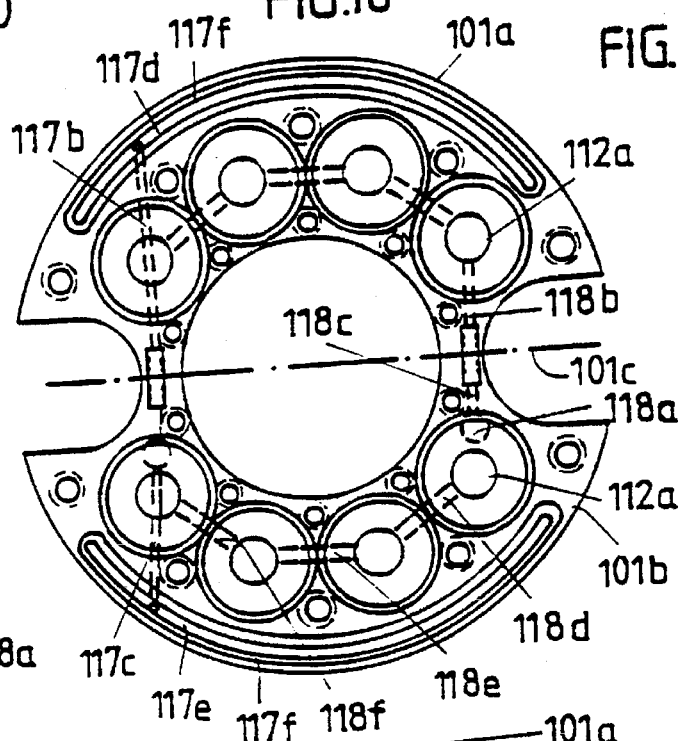
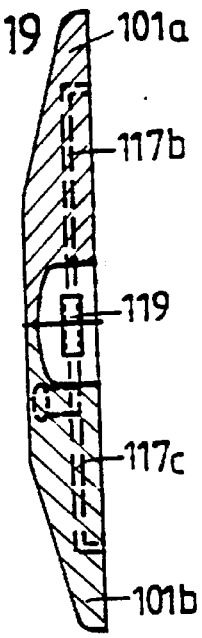
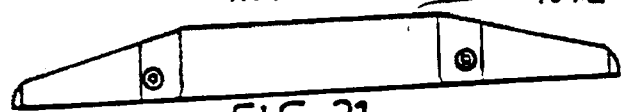
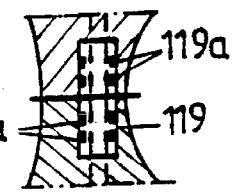
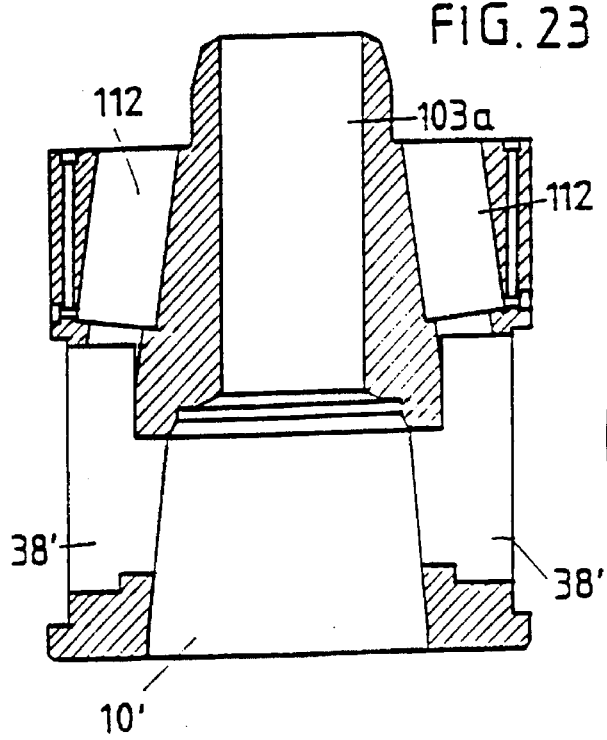
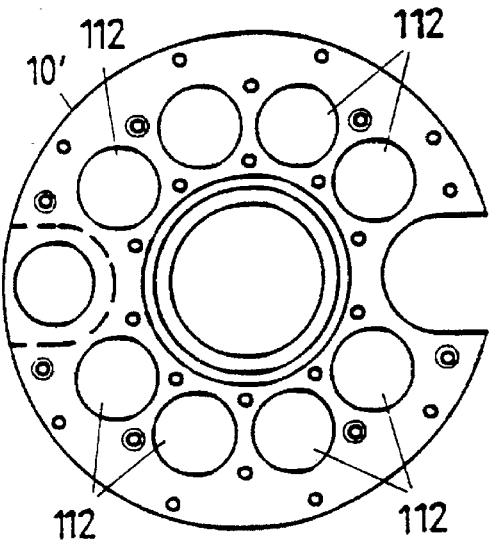

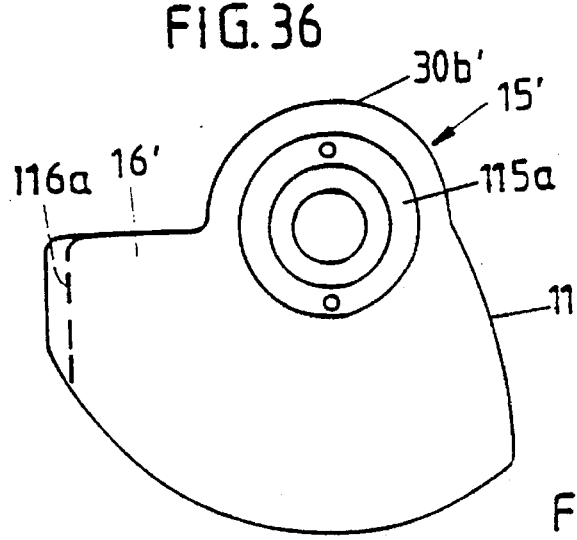
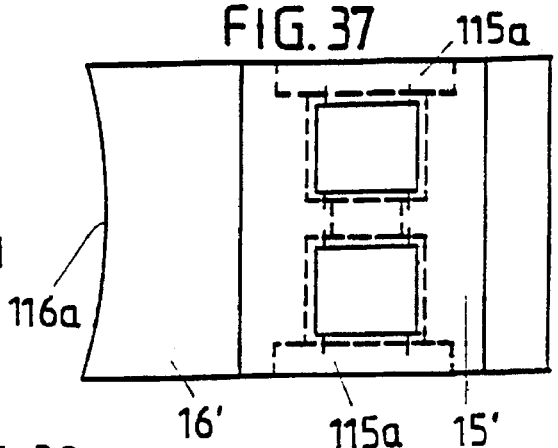
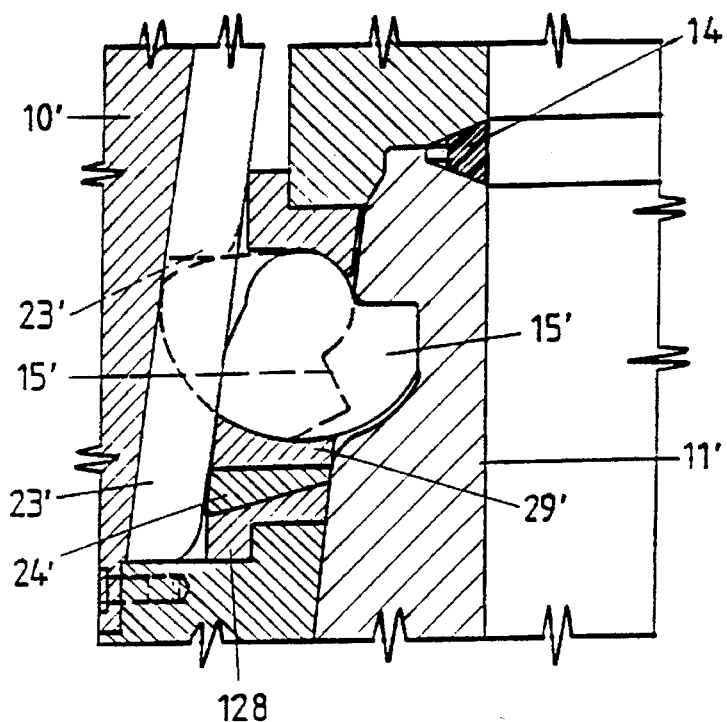
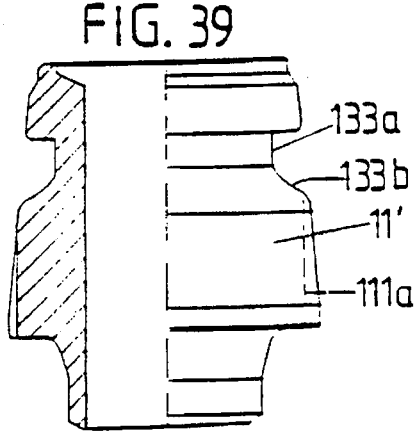
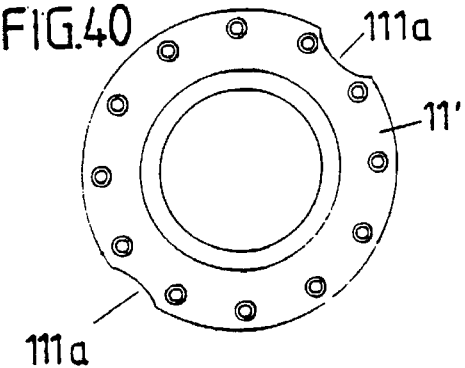

SEALING CONNECTION SYSTEM BETWEEN AXIALLY IMPACTING JOINT COMPONENTS

The present invention relates to a system for establishing a sealing connection in a pipe conduit between first and second axially impacting joint components.

The present invention is a further development of a system as illustrated in Norwegian Patent 167 474, in which a sealing ring is employed of elastically yielding metal (steel) for transmitting extraordinarily high loads on the sealing ring. In practical constructions of the present invention it is appropriate, but not a necessity, that the sealing ring is correspondingly as defined in this publication.

In known systems of the kind indicated by way of introduction the joint components, and especially the joint component which carries a tensioning means, are necessarily designed with a relatively large outer diameter. Generally, there is a need for joint components which occupy minimal space reckoned in the radial direction, but the need is particularly so when the system is used at locations where available space is rather limited, especially internally in the pipe conduits or in similar conveyors.

The invention is particularly directed to a sealing connection system between two joint components. In this respect, the pipe joint sealing connection system includes an elastically yielding sealing ring, preferably a metal sealing ring, of substantially wedge-shaped cross-section which is received in a groove located between opposite impact surfaces and an innermost surface of the joint components. The sealing connection system also includes an annular series of rotatable tension means which are rotatable about a respective axis in the first joint component between an inactive position and an active locking position wherein the joint components are mutually locked. The tension means are adapted to exert an axial prestressing force between the two axially impacting joint components via the sealing ring and the radial impact surfaces. The sealing system further includes an actuating means for each tension means, for example,. a slide which is movable in the first joint component and which is adapted for adjustment of the tension means between the inactive position and active position. Each tension means is provided on one side with a tension portion which cooperates with a stop in the second joint component and on the opposite side with a back surface which cooperates with the actuating means.

According to the invention the objective first and foremost is a system in which the joint components, especially the tension means-carrying joint component, can be designed with a minimal radial dimension, but also preferably with a minimal axial dimension. The particular aim is to arrive at a solution where the tension portion of the tension means can be moved within a relatively constricted work zone. In other words, the aim is a system having a particularly suitable tension means, which has a simple and solid construction and which in addition has a reliable and effective mode of operation.

By using pivotable tension means such as levers or fingers, as known per sea more compact construction may be arrived at.

GB-A-1 362 093 is illustrates a conduit connector, wherein a first connector member is provided with a plurality of pivotally mounted levers for engagement with an annular seat of a second connector member. The first connector member has an axially movable control member for common control of the pivotal movement of the levers. The control member is connected to a mechanically operated actuator by means of a set of connecting rods to provide the axial movements of the control member. Accordingly, all levers are operated by a common actuating means via a common control member, but not necessarily with the same pivotal force on each lever. This means that the load transmitted in the first connector member from the control member via the levers onto the annular seat of the second connector member may differ considerably in practice from lever to lever and may cause oblique load on the seat. During the transmission of high loads from the actuating means this may cause damage on the connecting rods and the levers and/or uneven sealing effect between the connector members.

GB-A-2 182 744 is suggests a remote-controlled subsea connector, for use in oil production systems. The connector components may be locked together by the aid of a collet finger ring and a common actuator ring for the fingers. The actuator ring is controlled in the axial direction of the connector by hydraulic actuation. The actuator ring comprises a manoeuvre ring and an annular shaped retaining means in contact with the manoeuvre ring and positioned against the fingers of the collet finger ring. The actuating ring provides a common pressure source and can be hydraulically actuated. In practice the common load from the common control member may cause the fingers to transmit individually different load on the annular retaining means. During the transmission of high loads from the actuating means this may, as mentioned above, cause damage on the levers and/or uneven sealing effect between the connector members.

In the present invention the objective is to arrive at an even more compact construction and in this respect to prevent possible damage on the load transmitting means and accordingly to secure an evenly distributed sealing load on the seal ring between the joint components.

The invention is characterised in that each tension means is operatable by means of a separate actuating means which is operated by an adjustable pressure from a common pressure source, whereby each of the actuating means comprises a piston forming slide or a slide incorporated in an associated piston for each tension means.

According to the present invention an evenly distributed sealing load on the seal ring is achieved by a slide movement of a number of slides, all of which are operated by one and the same pressure fluid. By employing pivotable tension means actuated individually by an axially moveable slide, one has the possibility of limiting the zone of movement of the tension means and thereby the extension of the joint members both in a radial direction and in an axial direction. More specifically, the tension portion of the tension means can be readjusted from the inactive to the active position within a limited work zone at the same time as the tension means can be designed with a compact construction having relatively small dimensions. This involves being able to readjust the tension portion of the tension means by means of a pivotal movement from an inactive position, in which the joint members can be moved unhindered towards and away from each other, to an active position, in which the joint members are arranged in supporting abutment against each other, in readiness for the transfer of a prestressing force between the joint members. Furthermore, this involves that thereafter, when the joint members form a mutually supporting abutment in their active positions of engagement, the prestressing force can be transferred separately between the joint components almost without movement of or only with a minimal movement of the tension means relative to the joint members, by increasing the load actuated through each separate slide.

Another important effect which is achieved by the aforementioned characterising feature of the invention is that one can ensure that the loading from the tension means towards the second, inner joint component can occur mainly in the axial direction of the joint component and without or only with a minimal loading in the radial direction towards the second, lower joint component. In other words, one has the possibility of transferring large axial loadings between the joint components within a relatively constricted radially extending zone by arranging the pivotal axis of the tension means relatively tightly up to cooperating impact surfaces of the joint components.

Present invention is further characterised in that the tension means, between two opposite end surfaces, is provided on the one side with the tension portion having an associated tension surface and on the diametrically opposite side is provided with a back surface, which cooperates with an actuating means separately moveable in the first joint component, for example a slide valve, for readjusting the tension means between the inactive position and the active position for mutual locking together of the joint components.

By way of simple means and in a ready manner, for example by linear movement of the actuating means (the slide valve) and accompanying swinging of the tension means, it is consequently possible to lock the tension means in the intended engagement position and thereby lock the joint components relative to each other. The joint components are thereby locked in a reliable manner relative to each other, independently of the prestressing force, and substantial mutual movement between the joint members both axially and radially can be avoided.

There is achieved by this a possibility to lock the joint components together separately immediately as they are pushed together into mutually supporting abutment, that is to say independently of and before effecting the transfer of the prestressing force between the joint components. By effecting the readjustment of the tension means independently of the prestressing force, the prestressing means can be swung without hindrances in a ready manner in a relatively unloaded condition. By effecting thereafter the transfer of the prestressing force in the locked position of tension means, one has consequently minimal need for movement of the tension means during the transfer of the prestressing force, something which in turn involves being able to support the tension means in an effective manner during the transfer of the prestressing force itself.

By further inactivating the joint between the joint components, that is to say by retraction of the activating means itself, the locking engagement between the joint components is removed and this involves the tension means being able thereby to be pivoted unhindered back to the inactive starting position by quite simply pulling the joint components in a direction away from each other.

The invention is further characterised in that the tension means is pivotably mounted in a housing member in the first joint component, and is moveable with a limited movement in the first joint component in its axial direction, and that a power-actuating means, in the form of a wedge, which is insertable in a gap in the housing member, is adapted to transfer a prestressing force against the tension means substantially in the radial direction of the tension means and via the tension portion of the tension means against the stop in the second joint component. In other words, it is only the displacing movement of the wedge itself which produces movement in the tension means and in that the displacing movement takes place in a region between the back side surface of the tension means and the tension surface of the tension means, one obtains a favourable power transfer from the first joint component to the second joint component via the stop of the tension surface in the second joint component.

By having the tension means pivotably mounted in a housing member in the first joint component and transferring the prestressing force from the power transfer means, via the wedge in a gap in the housing member, to the tension surface of the tension means, an effective support of the tension means can be simultaneously secured during the transfer of the prestressing force.

By combining the actuating means for adjustment of the tension means to and from the locking position with an actuating means for loading of the power transfer means (the wedge), there can be secured by simple means a locking of the joint components by way of introduction and thereafter an axial transfer of the prestressing force between the joint components in separate, but if necessary in directly following operations. In addition the mechanism which is to actuate the tension means during its different functions, that is to say the locking function and the power transfer function, can be simplified.

It is preferred that each power transferring tension surface coincides with or is substantially aligned with a plane through the pivotal axis of the tension means. By this, one can ensure that the tension force which is exerted from the actuating means (the slides) towards the respective tension means, in a direction substantially radially inwards towards the tension means, is transmitted mainly in an axial direction through the first, upper joint component and almost exclusively in an axial direction through the second, lower joint component, the resultant force being received in the housing member in the first, upper joint component. This preferred solution also fulfills the need to produce as far as possible a compact construction having the least possible axial and radial dimensions.

Further features of the invention will be evident from the following description having regard to the accompanying drawings, in which:

FIG. 3 shows a cross-section of a first joint component.

FIG. 4 shows a side view of a second joint component.

FIGS. 6A–6F show the components in FIG. 6, illustrated individually, with the tension means shown in FIG. 6E.

FIG. 9 shows in perspective view an actuating means in the form of a slide.

FIG. 10 shows in side view an alternative construction of a coupling together unit according to the invention.

FIG. 11 shows in plan view, seen from above an upper end cover member of the coupling together unit according to FIG. 10.

FIG. 12 shows in plan view, seen from below a lower end cover member of the coupling together unit of FIG. 10.

FIG. 13 shows the coupling together unit partly in side view and partly in section in a condition ready for use.

FIGS. 14 and 15 show in side view and in front view respectively an actuating means in the form of a slide and an associated piston rod.

FIGS. 16 and 17 show in vertical section and in plan view respectively, seen from above a packing sleeve for the piston rod as shown in FIGS. 14 and 15.

FIG. 18 shows the end cover member according to FIG. 11 seen from the under side.

FIGS. 19 and 20 show cross-sections of the end cover member illustrated along lines 19—19 and 20—20 respectively in FIG. 18.

FIG. 21 shows a side view of the end cover member illustrated along a transverse section line 101c.

FIG. 22 shows a packing sleeve in a part of the end cover member according to FIG. 18.

FIG. 23 shows a vertical section of an upper joint component.

FIG. 24 shows from above a plan view of the upper joint component.

Figure 25:
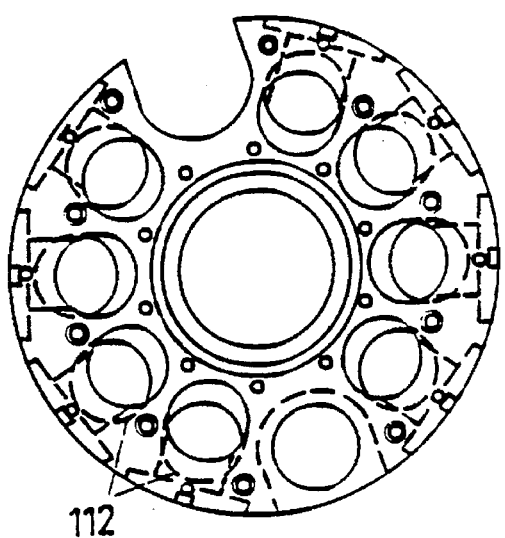

FIG. 25 shows in plan view the upper joint component, correspondingly as shown in FIG. 24, with certain cavities shown drawn in broken lines.

Figure 26:
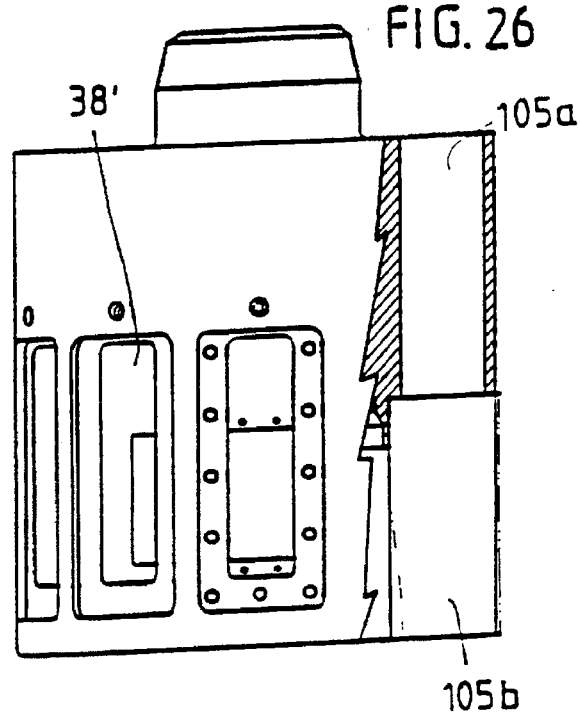

FIG. 26 shows the upper joint component, illustrated partly in side view and partly in vertical section.

Figure 27:
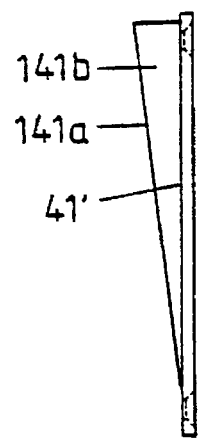
Figure 28:
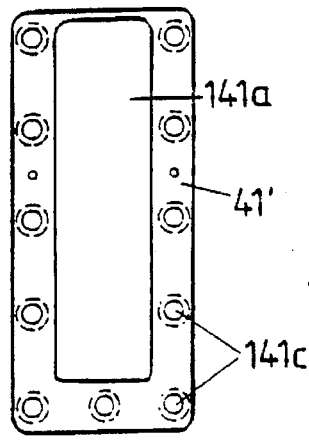

FIGS. 27 and 28 show a side view and a rear side view respectively of a lid for covering a tension means and its cooperating parts.

Figure 29:
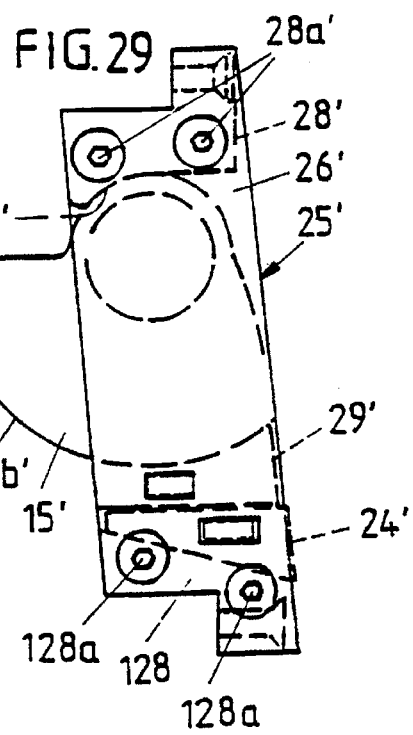
Figure 30:
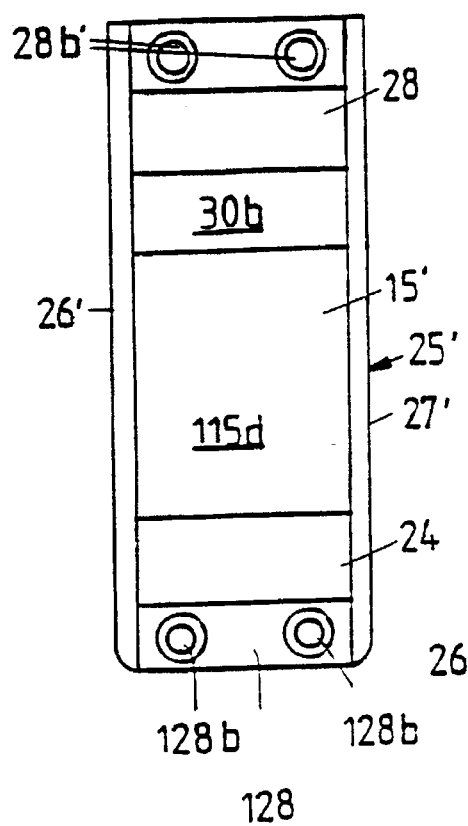

FIGS. 29 and 30 show a housing member seen in side view and rear side view respectively.

Figure 31:
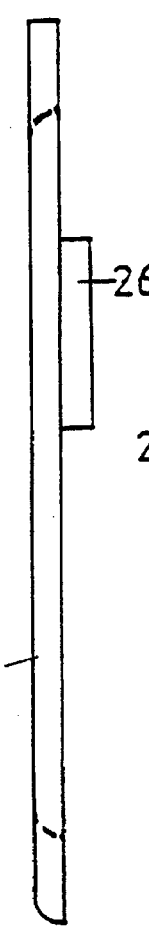
Figure 32:
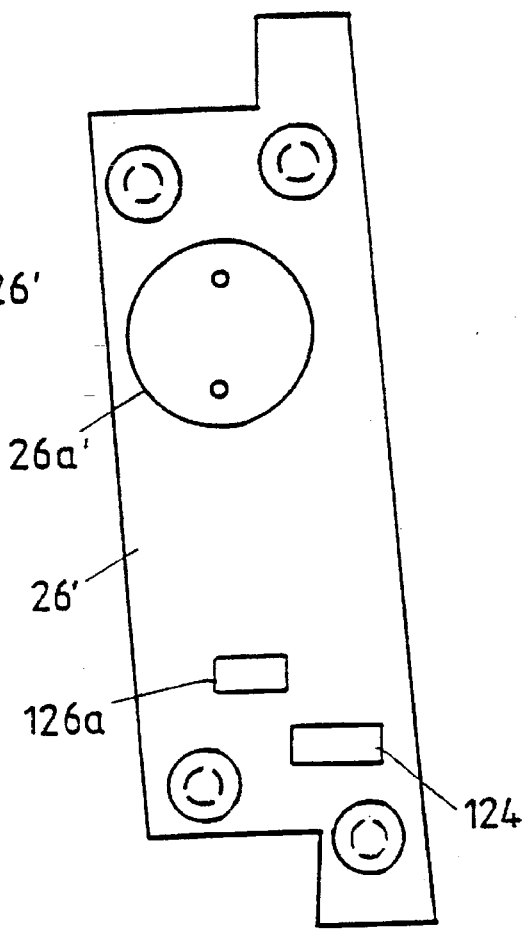

FIGS. 31 and 32 show a side piece for the housing member seen in rear side view and side view respectively.

Figure 33A:
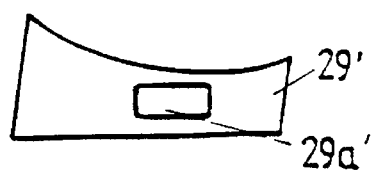

FIG. 33a shows an end view of a wedge stop.

Figure 33B:
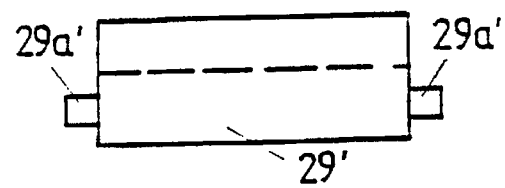

FIG. 33b shows a side view of the wedge stop of FIG. 33a.

Figure 34:
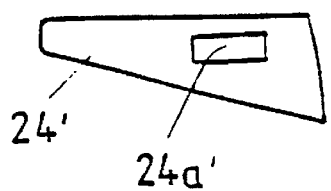
Figure 35:
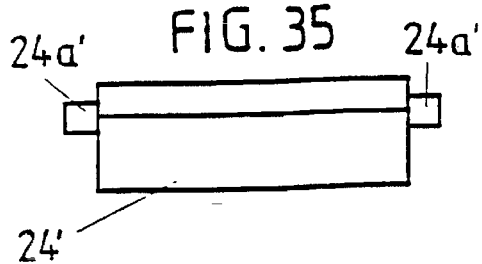

FIGS. 34 and 35 show an end view and a side view respectively of a wedge which forms the power transferring prestressing means of the tension means.

FIGS. 36 and 37 show respectively a side view and a plan view seen from above of a tension means according to the invention.

FIG. 38 shows in a part the details of the slide and its associated tension means of FIG. 13.

FIGS. 39 and 40 show the second, lower joint component illustrated partly in side view and partly in vertical section and seen from below in plan view respectively.

FIGS. 1 to 9 illustrate a first embodiment wherein two cooperating joint components 10, 11 are illustrated without connection to adjacent conduit pieces and without surrounding well pipes. In practice, however, each of the joint components will be permanently connected at a corresponding end to an associated, aligned pipe piece or other corresponding connection piece, which forms a part of a gas/oil/medium conduit, which in turn will be receivable in a well pipe. For the sake of clarity end covers are omitted in the construction according to FIGS. 1–9, opposite end covers only being illustrated in the embodiment of FIGS. 10–40.

The joint components 10,11 are more especially applicable in connection with offshore well boring operations and in connection with gas or oil conduits and are particularly designed in order to function under high medium pressures with extremely high pressures occurring occasionally.

Figure 1:
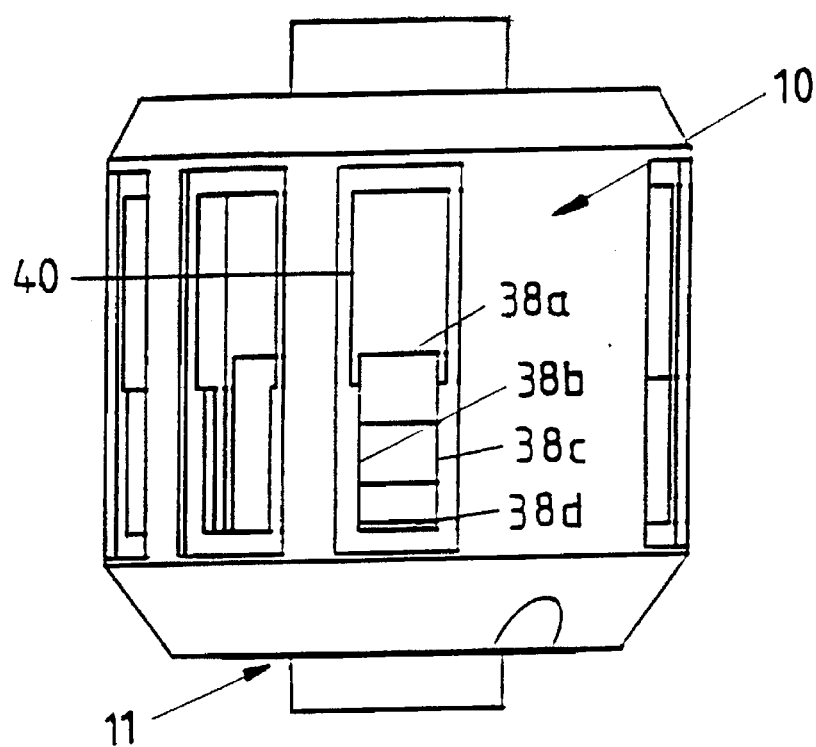
FIG. 1 shows two cooperating joint components, seen in side view, according to a first schematic embodiment.
Figure 2:
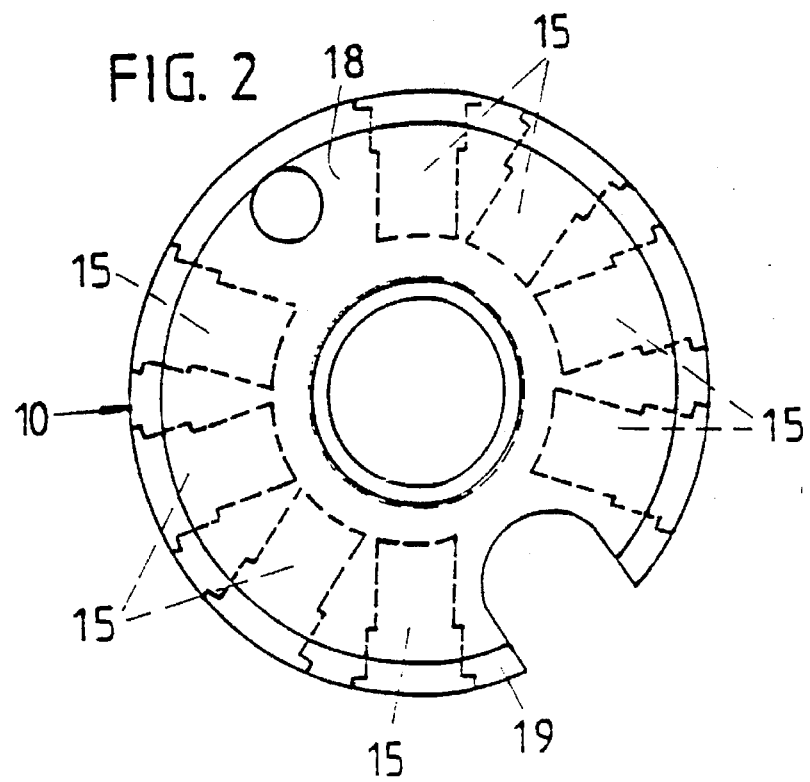
FIG. 2 shows a plan view of the same as in FIG. 1, seen from above.
Figure 8:
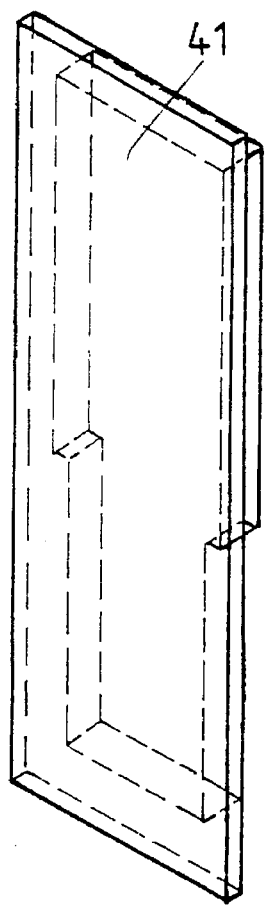
FIG. 8 shows in perspective view a lid for covering the tension means and its cooperating parts.
Figure 5A:
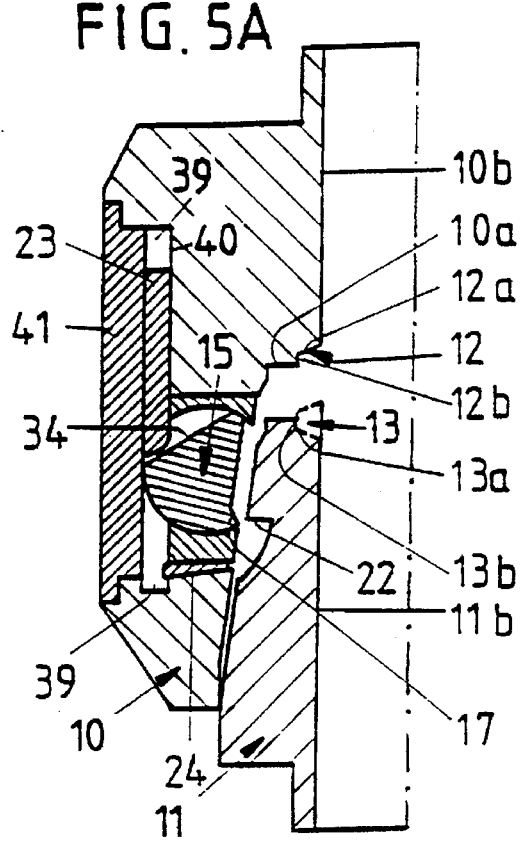
FIGS. 5A–5C show in cross-section the coupling together of the joint components, illustrated in three successive coupling phases.
Figure 5B:
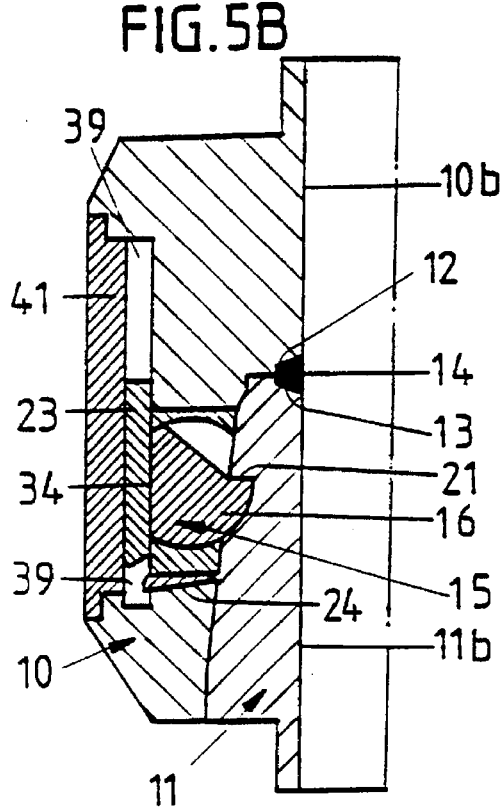
Figure 5C:
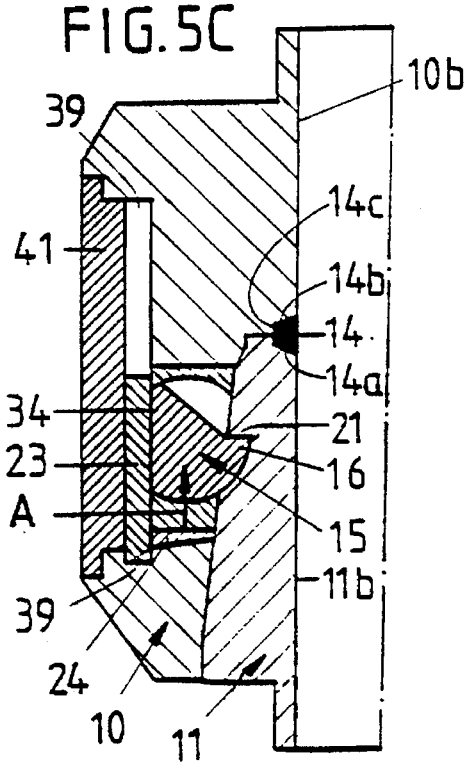

In FIGS. 3 and 5C, the joint components 10,11 are shown in detail in axially coupled together condition for use. A first, socket-forming joint component 10 (see FIG. 5A) forms an axial support abutment against a second, insertion part-forming joint component 11, via their respective mutually cooperating, radially extending impact surfaces 10a and 11a respectively. In FIGS. 1 and 5C the insertion component 11 is shown in place in a fully pushed in, locked position in the socket component 10.

The sealing connection between the joint components 10,11 is special on account of the coupling unit being designed so as to be able to compensate for extremely high pressures occurring occasionally. Radially within the impact surface 10a of the joint component 10 (see FIG. 5A) a bevelled cavity 12 is formed, which opens inwardly towards a radially innermost surface 10b of the joint component 10, while radially within the impact surface 11a of the joint component 11 there is formed an equivalent, bevelled cavity 13, which opens inwardly towards a radially innermost surface 11b of the joint component 11. Between the cavities 12 and 13 there is received an elastically yielding metal sealing ring 14 (see FIGS. 5B and 5C) having a trapezoidal cross-section. The joint components 10,11 are consequently mutually sealed off with a single sealing ring 14, which is arranged tightly up to the impact surfaces 10a, 11a.

In order to secure a sealing off via the elastically yielding metal sealing ring there is a need for a prestressing force which is exerted via the sealing ring. The prestressing force is limited to a specific size (for example 20 ton) in a manner known per se, as is illustrated in NO 167 474, by the mutual abutment of the joint components 10,11 via the impact surfaces 10a, 11a.

The sealing ring 14 is provided with opposite clamp surfaces 14a and 14b, which form supporting abutments against equivalent sliding surfaces 12a and 13a of the cavities 12,13. The clamping force, which is exerted against the sealing ring 14 via the clamp surfaces 14a and 14b and which to a corresponding degree can deform the sealing ring 14, is determined by the supporting abutment between the impact surfaces 10a, 11a.

The radial outer narrow end surface 14c of the sealing ring is shown in FIG. 5C at a certain radial distance from equivalent end surface sections 12b and 13b of the cavities 12,13, so that in the bottom of the cavities 12,13 there is formed a chamber, in which the sealing ring can be received (in the yielding condition of the material) on the occurrence of exceptionally high medium pressures in the bore internally in the joint components 10,11. The sealing ring can thereby be allowed to "yield" as required in a direction radially outwards. Such a solution is shown further in NO 167 474.

In order to ensure a uniformly distributed surface pressure on the sealing ring 14 having said prestressing force, it is of great importance that the tightening together of the joint components 10,11 happens in a controlled, accurate manner. It is furthermore of great importance that the coupling together unit is constructed as far as possible compactly, so that it occupies as little as possible space both axially and radially in the surrounding pipe conduit. As is evident from FIG. 2, the first joint component 10 is provided with four pairs of diametrically opposing tension means (dogs) 15 in an annular array directed radially inwards, each with an associated tension portion 16 (see FIG. 3) having an active tension surface 17. The tension means 15 are distributed having 36° angle intermediate spacings, while two diametrically opposing intermediate spacings 18,19, which form cavities in the coupling unit itself, are without tension means.

As is evident from FIG. 4 the remaining, second (lower) joint component 11 is provided with a cavity 20 opening radially outwards having a stop surface 21, with associated radially extending support surface 22, for tension surface 17 of the tension means.

In FIG. 5A tension portion 16 of the tension means 15 is shown in an inactive, retracted position of the first joint component 10, so that the second, insert portion-forming joint component 11 can be freely pushed inwardly into and outwardly from the socket-forming joint component 10.

Figure 7:
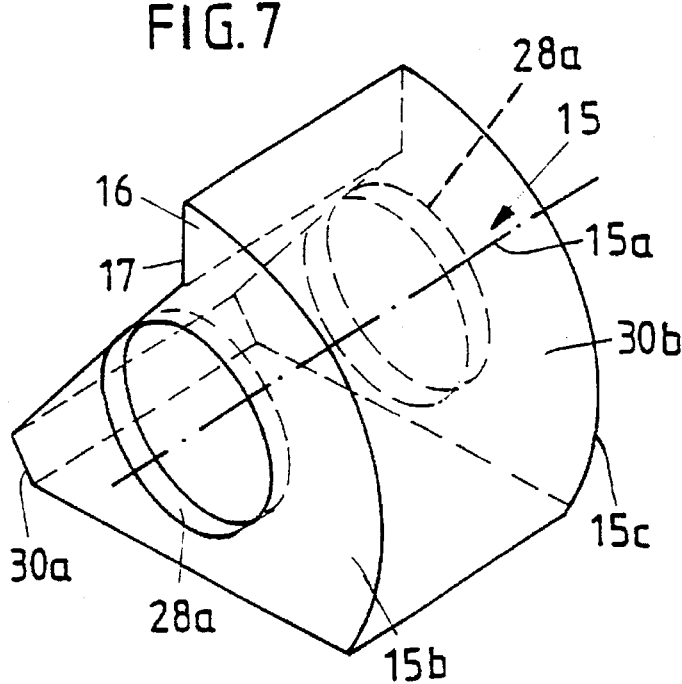
FIG. 7 shows the tension means in perspective from another visual angle than illustrated in FIG. 6E.

In FIG. 5B the joint components 10,11 are pushed axially together (the sealing ring 14 is indicated by broken lines in FIG. 5A). Thereafter the tension means 15 is rotated about a longitudinal axis 15a, as shown in FIGS. 6E and 7 from the inactive position to an active locking position, so that the tension portion 16 of the tension means 15 is pivoted inwardly into the cavity 20 and so that the tension surface 17 forms an abutment against the support surface 22 of the stop surface 21 of the joint component 11. The rotation of the tension means 15 is achieved by an actuating means in the form of a slide 23 being pushed vertically downwards from a rest position to an extended position along a backside surface 34 of the tension means 15, that is to say on the opposite side of the tension means relative to the tension portion 16. As is shown in FIG. 9 the slide 23 is provided with an obliquely bevelled, rounded guide edge 23a at its lower, inner end.

In the position as shown in FIG. 5C, that is to say after the tension means 15 has assumed its locked position, as shown in FIG. 5B, a considerable clamping force A is exerted from the tension means 15 and further through the joint components 10,11 across the sealing ring 14 until supporting abutment is obtained between the impact surfaces 10a, 11a. This clamping force is exerted towards the tension means 15 by the slide 23 being pushed downwards and pressing a wedge 24 radially inwards into a gap 35 (see FIG. 3) between the tension means 15 and the lower end of the joint component 10.

Figure 6:
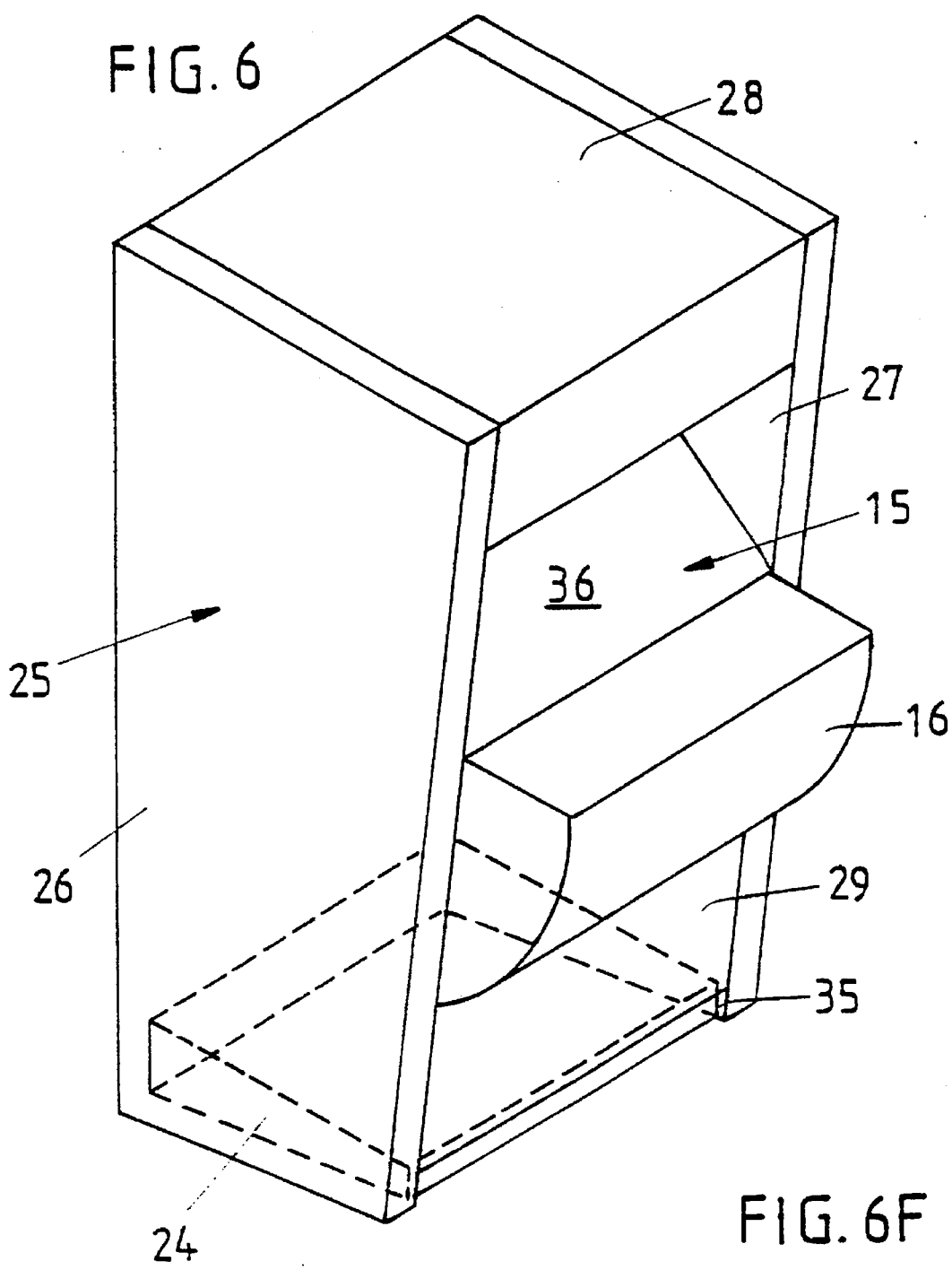
FIG. 6 shows a perspective view of the tension means with associated parts in a mounted together condition.
Figure 6F:
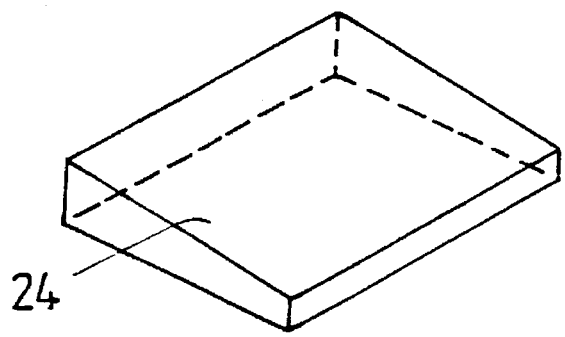

With reference to FIG. 6 a practical construction of the tension means 15 and cooperating parts is shown for readjusting and locking the tension means relative to the joint component 11 and for the exertion of a clamping force between the joint components 10,11 via the tension portion 16 of the tension means 15 and the stop 21 of the joint component 11.

The tension means 15 (see FIGS. 6E and 7) is composed of steel in a solid construction. As shown in FIG. 6 the tension means 15 is received rotatably mounted in a housing component 25, which comprises two opposing side pieces 26,27 (see FIGS. 6A and 6B) and an intermediate top member 28 (FIG. 6C) together with an intermediate bottom member 29 (FIG. 6D). In a first construction, as illustrated herein, the members 26–29 together with the tension means 15 are mounted together in loose connection with one another and held in place relative to one another by means of a cavity 38 (FIG. 3) adapted for this purpose in the joint component 10. By this the tension means in an unloaded starting position has the possibility of being able to be turned relatively unhindered between members 26–29 of the housing component 25, from and to the locking position of the tension means as required.

On the other hand when the tension means 15 has assumed its locking position, it can be firmly clamped between certain of the housing members (top member 28 and bottom member 29) under the power loading of the tension means. The tension means 15 is rotatably mounted with a rotary fit and the power loading is transmitted from the tension means 15 to the housing component 25 via pivot bearings 26a,28a and 27a,28a.

In a second, preferred construction, which will be described further along in the description (see FIGS. 29–30) the members are connected to each other by way of fastening means in the form of guide surfaces and associated guide pins into a coherent housing component.

In two opposite end surfaces 15b, 15c of the tension means 15 there are formed bearing-forming cavities 28a, while the side pieces 26,27 are provided with equivalent bearing-forming tenons 26a,27a which project laterally inwards into the cavities 28a (FIG. 6). The tension means 15 is provided on diametrically opposing side portions with cylindrically curved surfaces, that is to say a first narrow surface 30a and a second broad surface 30b. The narrow surface 30a cooperates with and forms a supporting abutment against a broad cylindrically curved surface 31 of the top member 28, while the broad surface 30b cooperates with and forms a supporting abutment against a broad cylindrically curved surface 32 of the bottom member 29 and (respectively in FIGS. 8 and 9) and against a broad cylindrically curved surface 33 (FIG. 4) of the cavity 20 of the joint component 11. On the one side between the surfaces 30,31 the tension means 15 is provided with the back surface 34 which forms a sliding and actuating surface for the slide 23. On the other side between the surfaces 30,31 the tension means 15 is provided with a first broad surface 36, which is concavely angled (FIG. 6) relatively to a second narrow surface which forms tension surface 17 of the tension portion 16. The tension portion 16 emerges consequently as a projection relative to the surface 36.

The wedge 24 is, as illustrated in FIG. 3, shown introduced into a gap 35 between the bottom member 29 and the joint component 10.

The tension means 15 with associated housing component 25 (with individual members 26–29) together with the wedge 24 are in the form of separate components which are pushed into an equivalent cavity 38 in the joint component 10. Provision is made for a certain fit between the housing component 25 and the cavity 38. This is done inter alia in order to ensure a ready and unhindered rotation of the tension means from the position shown in FIG. 5A to that shown in FIG. 5B, that is to say in a phase where the tension means is without power stress or is only exposed to minimal power stress. In other words the tension means 15 is already adjusted into the active (locking) position before the pre-stressing force is supplied via the housing component 25 to the tension means 15.

The cavity 38 (FIG. 1) is provided along the top and the sides with guide surfaces 38a,38b,38c, which extend mutually parallel and at right angles to a longitudinal plane through the joint components 10,11, that is to say parallel to the equivalent outer top surface and outer side surfaces of the housing component 25. Along the bottom the cavity is provided with an oblique surface 38d, which crosses said longitudinal plane at an angle of approximately 7°, that is to say equivalent to the angle of the wedge, while bottom surface 29a of the bottom member 29 extends at right angles to said longitudinal plane. On driving the wedge 24 into the gap between the bottom member 29 of the housing component 25 and the oblique surface 38d of the cavity 38 in the joint component 10, the housing component 25 with associated tension means 15 is clamped correspondingly vertically upwards, the top of the housing component 25 forming a supporting abutment top surface 38a of the cavity. Radially outwardly facing side edge surfaces (in top member, bottom member and side members) of the housing component 25 together with back surface 24 of the tension means 15 form supports against inner surface 23a of the slide 23. Broad surface 30b of the tension means 15 forms a support against the surface 33 of the cavity 20 in the joint component 11 and tension surface 17 of the tension means 15 forms a support against support surface 22 of the stop 21. During prestressing of the tension means 15 by means of the wedge 24 the prestressing force from the wedge 24 is transferred via the bottom member 29 of the housing component 25 to the tension means 15, and via the bearing-forming tenons 26a, 27a of the end pieces 26,27 respectively. The prestressing force A from the wedge 24 is transferred further from the tension means 15 to the stop 21, while the tension means 15 forms a support against the surface 33 of the cavity 20. The slide 23 is displaceable in side guides 39, which are defined between an outer portion 40 of the cavity 38 and a cover 41, the cover 41 supporting the slide 23 during its readjustment of the tension means 15 and during the driving in of the wedge 24 into the gap between the housing component 25 and bottom side 38d of the cavity 38. It is not shown further in the embodiment according to FIGS. 1–9, but pressure medium can for example be employed for moving the slide 23 from the position illustrated in FIG. 5A to that illustrated in FIG. 5C and also for the exertion of the prestressing force A which is transferred to the wedge 24. Such an embodiment is illustrated further in the modified construction of FIGS. 10–40.

By employing pressure medium to a pressure applying means which is common to respective slides 23 of all said eight tension means 15, a uniform movement of all the slides 23 can be guaranteed and thereby a uniform movement of all the tension means together with a uniform power loading and uniform movement of all the wedges 24, in order to prevent thereby oblique loading of the various tension means 15 and in order to prevent oblique loading of the second joint component 11 relative to the first joint component 10.

In that which follows there will be described further details with reference to some modified constructions of the different components which form a part of the coupling together unit. The modified components are designated by the same reference numerals as the components according to FIGS. 1–9, but designated with a mark (') so as to indicate the modification. In addition new parts are designated with reference numerals with figures larger than "100". The modifications do not involve any substantial functional changes from that which is described in connection with the construction of FIGS. 1–9.

In FIG. 10 a modified coupling unit 100 is shown which comprises an upper, outer joint component 10' with associated upper end cover member 101 (see FIG. 11) and a lower inner joint component 11' with associated lower end cover member 102 (see FIG. 12).

In FIG. 13 there is shown to the right a vertical section of the coupling unit 100 along a line 13a—13a, as illustrated in FIG. 12, while to the left there is shown a vertical section along a line 13b—13b, as shown in FIG. 12. In FIG. 13 there are shown the joint components 10',11' in the same position as illustrated schematically for the joint components 10,11 in FIG. 6.

In FIG. 13 there is shown a middle bore 103a in the joint component 10' and a middle bore 103b in the joint component 11'. The bores 103a,103b form a main conduit connection through the coupling together unit 100.

Radially outside the bores 103a, 103b there is formed on the one side of the coupling together unit 100 a duct-forming, radially opening cavity 104, which creates control for a separate pipe member (not shown) in a separate first auxiliary conduit connection. The coupling unit 100 and particularly the joint component 10' with associated components are adapted to be able to be moved axially along the pipe member and independently of the pipe member not shown further, which is adapted to be received in the cavity 104.

Radially outside the bores 103a, 103b, that is to say diametrically opposite the cavity 104, the coupling unit 100 is provided with a pair of axially following bores 105a,105b. The bore 105b is shown herein as a cavity with a U-shaped cross-section. In the bores 105a, 105b there are installed separate pipe joint members 106,107, which form a part of a second pipe conduit in a second separate auxiliary conduit connection. In the illustrated embodiment the pipe joint members 106,107 are shown separately, while in practice they are fixedly connected with their respective associated pipe member (not shown further). The one pipe joint member 106 has a lower head portion 106a which is received in the lower cavity/bore 105b and an upper stem portion 106b which is received in the upper bore 105a. The head portion 106a is fastened in between an annular support surface 10c of the joint component 10' in the transition between the bores 105a, 105b and an annular support surface 102a of the lower cover 102. The head portion 106a is attached via the lower cover 102 to lower joint component 11' of the unit 100 by means of fastening screws 102b. Above the joint member 106 is attached via a screw thread 106c on the stem portion 106b by means of a nut 108a and a lock nut 108b, the nut 108a forming a stop against an annular support surface 110d of the joint component 10'.

The lower pipe joint member 107 is pushed endways inwardly into the lower head portion 106a of the upper pipe joint member 106 and is sealed off relative to the same by means of a pair of O-rings 109. By means of head portion 106a and stem portion 106b of the pipe joint member 106 the joint components 10',11' are positioned and shut off in a precise angular position relative to each other. On axially displacing upper joint component 10' of the coupling unit 100 into engagement with its lower joint component 11', guided along the first pipe conduit (not shown), the second pipe conduit of the coupling unit 100 can be accurately coupled together by pushing in pipe joint member 107 of the joint component 11' into lower head portion 106a of the pipe joint member 106.

There is secured a slide fit between the joint members 106 and 107 and secured a certain axial free movement between the members, so that the latter are not affected by occasional movements between the joint components 10,11 on the occasional occurrence of extremely high medium pressures in the bores 103a, 103b.

In the construction as illustrated in FIG. 13 the slide 23' is shown rigidly connected to a piston rod 110, which has a piston 111 received in a cylindrical bore 112 in the joint component 10'. By this the slide 23' can be moved in an accurately controlled manner by means of a regulatable medium pressure. The slide 23' is provided above with an inverted T-shaped cavity 113 for the reception of an inverted T-shaped projection 114 on the lower end of the piston rod 110, as is illustrated in FIGS. 14–15. The piston 111 is provided with annular grooves 111a for the reception of their respective O-rings 111b, as shown in FIG. 15. Just above the piston 111 an end stopper member 115 projects upwards.

At the lower end of the cylinder bore 112 a packing sleeve 116 is fastened in, which is shown further in FIGS. 16 and 17. In the middle bore 116a there are shown a pair of grooves 116b for reception of their respective O-rings 116c for sealing off the piston rod 110. In a support flange 116d there is a groove 116e for the reception of an O-ring (not shown further) for sealing off against a layer of the joint component 10', the sleeve 116 being provided with external screw thread 116g for screwing into a corresponding thread in the joint component 10'. In the top of the sleeve 116 there are shown cavities 116h for the reception of insert tenons from a tool (not shown) for rotating the sleeve relative to the joint component 10'.

The coupling together unit 100 is provided with eight separate cylinder bores 112, that is to say a series of four cylinder bores on each respective side of the coupling together unit. At the upper end the cylinder bores are covered by an upper end cover 101 (FIG. 11). On the upwardly facing side (see FIGS. 10 and 11) of the end cover coupling nipples 117,118 are fastened for pressure oil conduits (not shown further).

The nipple 117 is, as is shown in FIGS. 18 and 19, connected via an associated axial bore 117a in the end cover 101 to a pair of transverse bores 117b,117c, which discharge into their respective downwardly opening peripheral grooves 117d, 117e in the end cover 101. The peripheral grooves 117d and 117e are surrounded by their respective sealing ring 117f.

Correspondingly the nipple 118 is, as shown in FIGS. 18 and 20, connected via an associated axial bore 118a in the end cover 101 to a pair of transverse bores 118b, 118c which discharge into their respective top portion 112a of their respective cylinder bore 112. Four cylinder bores 112 are shown in series on their respective sides of the joint component 10. Each series of cylinder bores 112 are provided with intermediate bores 118d,118e,118f.

The end cover 101 is divided into two halves 101a,101b along a dividing line 101c, as shown in FIG. 18, with four cylinder bores 112 on each side of the dividing line 101c. In FIG. 21 the one half 101a is shown in side view seen towards the associated dividing surface. In FIG. 22 a sealing sleeve 119 is shown having associated O-rings 119a, which is inserted in the joint between the halves 101a and 101b in their respective transverse bores 117b and 118b for sealing off the bore in said joint. A series of fastening holes 101d are shown for fastening bolts for fixing the cover halves 101a and 101b to the joint component 10'.

In FIG. 23 the joint component 10' is shown in cross-section and in FIG. 24 in plan view, seen from above, illustrated without associated coupling members. In FIG. 25 the cylinder bores 112 and an adjacent cavity 38' for the coupling members are indicated in broken lines, while said cavity 38' is shown sideways in FIG. 26.

In FIGS. 27 and 28 a side view and a back side view are shown of a cover 41' which covers the cavity 38' and which with its obliquely extending back side surface 141a forms in a projection 141b a support surface for the slide 23', so that the Slide 23' can be moved in an accurately controlled manner relative to a tension means 15' together with an associated wedge 24'. The cover 41' is provided with a series of screw holes 141c for fastening the cover 41' to the outer side of the joint component 10' for accurate positioning of the cover and also for effective support of the cover during the exercise of tension force between the slide 23' and the wedge/tension means 24'.

In FIGS. 29 and 30 a housing member 25' is shown in side view and back side view respectively with the tension means 15' illustrated in its locking position. The housing member 25' has two side pieces 26',27' which are mutually connected above with an intermediate top member 28' by means of first fastening screws 28a', the top member 28' being connected to the joint component 10' by means of second fastening screws 28b'. Below the side pieces 26',27' are mutually connected to an intermediate, separate bottom member 128 by means of first fastening screws 128a, the bottom member 128 being connected to the joint component 10' by means of second fastening screws 128b. A bearing-forming pin 26a' projects, as shown in FIGS. 31 and 32, laterally inwards from the side piece 26' so as to be receivable in an equivalent cavity 115a in the tension means 15'.

In FIG. 32 there are shown in the pin 26a' fastening holes 26" and in FIG. 36 there are shown in the tension means 15' equivalent fastening holes 26" for receiving fastening pins on a torsion spring 126 as illustrated schematically in FIG. 37. By means of the torsion spring 126 the tension means can be positively guided from the active locking position, as shown in full lines, to the released position, as shown in broken lines in FIG. 38. This means that immediately the slide 23' is retracted from the position in full lines to that in broken lines in FIG. 38, the tension means 15' can correspondingly be forcibly readjusted to the position illustrated in broken lines. If desired the tension means 15' can alternatively or in addition be readjusted to the last mentioned position by physically drawing the joint components 10' and 11' axially from each other.

The wedge 24', as a result of it having a lower oblique surface which forms an angle of approximately 15° relative to the horizontal top surface, will normally be able to be readily released from its support surfaces when the slide 23' is retracted to the upper position illustrated in broken lines in FIG. 38.

Alternatively, instead of actuating the wedge 24' directly with the slide 23', the movement of the slide can be terminated at a level just above the wedge and with a suitable, separately moveable actuating means, which extends as an elongation of the slide 23' positively draw the wedge 24' laterally out of the engagement with adjacent support surfaces or positively push the wedge 24' into place between the support surfaces at the same time as the slide is moved correspondingly between its opposite outer positions. By this one has the possibility of readjusting the wedge 24' and the tension means 15' individually with a common actuating movement.

In the construction of FIGS. 1-9 the wedge 24 forms a supporting abutment directly against an oblique surface 38d of the cavity 38 in the joint component 10. In the construction according to FIGS. 10–40 there is employed instead the separate bottom member 128, which forms a part of the housing 25', which in turn is rigidly fastened to the joint component 10' in the cavity 38'. FIG. 33A shows an end view of a wedge stop 29' which has a limited possibility for movement relative to the housing member 25'. The wedge stop 29' is provided with two guide pins 29a' of rectangular cross-section projecting laterally outwards, which are received with a certain degree of movement as to height and length in an equivalent rectangular cavity 126a in each of the side pieces 26',27'.

In FIGS. 34 and 35 there is shown a side view and an end view of a wedge 24', which is provided with two guide pins 24a' having a rectangular cross-section projecting laterally outwards which are received with the possibility for a significantly greater movement as to length and height than the possibility for movement of the wedge stop 29', for movement in a more elongate cavity 124a (see FIG. 32) in each of the side pieces 26',27'.

On driving in the wedge 24' into a gap 35 between the bottom member 128 and the wedge stop 29' the wedge stop 29' is adapted to be lifted a limited height and to be tensioned with a tension force radially against the peripheral portion of the tension means 15' for locking the tension means 15' in its active locking position. The driving in of the wedge 24' occurs initially after the tension means 15' is forcibly rotated to its active locking position. By means of the guide pins 24a on the wedge 24' and the guide pins 29a on the wedge stop 29' it is possible to ensure a limited movement of the wedge 24' and the wedge stop 29' in the intended manner relative to the housing member 25', while the housing member 25' moreover is secured accurately in place in the associated joint component 10'.

In FIGS. 36 and 37 there is shown a side view and a plan view from above of the tension means 15'. The tension portion 16' of the tension means 15' is shown formed with a concavely curved end surface 116a in order to close as tightly as possible into a cylindrical surface portion 133a of the joint component 11' (see FIG. 39). The surface portion 133a continues obliquely outwards and downwards with a concavely curved transition portion 133b, which is adapted to a part-cylindrical support surface 30b' on one side of the tension means 15' (see FIG. 29), which corresponds to the support surface 30b of the construction of FIGS. 1–9. On the opposite side the tension means 15' is provided with a part-cylindrical support surface 30a' which can form a sliding abutment against a part-cylindrical surface 31' on the top member 28'. The support surface 30a' has a significantly larger surface area than the relatively narrow support surface 30a which is illustrated in the construction of FIGS. 1–9.

The tension means 15' extends on the back side, from the part-cylindrical support surface 30b', having a slightly convexly curved support surface 115d in order to ensure as far as possible a uniform sliding of the slide 23' and as far as possible an equivalently uniform turning of the tension means 15', the slide 23' being led along the support surface 115d of the tension means 15' between the position which is illustrated in broken lines and the position which is illustrated in full lines in FIG. 38.

In FIG. 39 there is illustrated a side view of the one half of the joint component 11' and a vertical section of the other half of the joint component 11', while in FIG. 40 the joint component 11' is illustrated seen from the underside. Compared with the illustrations in FIGS. 11 and 13 it will be evident that concave cavities 111a are formed on opposite sides of the joint component 11' which are flush with the cavity 104 and the bore/cavity 105b of the joint component 10'. Provision is made for the cylindrical surface 133a of the joint component 11', which forms the stop for the end edge surface 116a of the tension means 15', to be arranged at a relatively short distance from the bore 103b that is to say substantially on line with the radially outermost portion 13b' of a metal sealing groove 13', so that the prestressing force which is transferred between the joint components 10',11' is transferred in the joint component 11' substantially axially from a lower radially extending stop surface 22' to an upper radially extending support surface 11a'. By this an effective side support is achieved for end edge surface 116a of the tension means 15' against cylindrical surface 133a of the joint component 11' and at the same time an effective centering of the joint component 11' between the four pairs of tension means 15'. By employing a common pressure medium on all the tension means 15' a self-adjusting local loading of the joint component 11' can be ensured relative to the joint component 10' with a total loading adapted for this purpose radially and axially of the joint components 10',11'.

I claim:

1. In combination,
   a pair of axially disposed joint components, each said component having an annular surface facing and mating with an annular surface of the other of said components and a first of said components having a stop surface thereon;
   an annular array of tension means, each said tension means being rotatably mounted in a second of said components to rotate between an inactive position spaced from said first component and an active locking position engaging said stop surface of said first component to secure said joint components together;
   a plurality of actuating means, each said actuating means being slidably movable from a rest position to an extended position to rotate a respective tension means from said inactive position to said active position thereof for pressing said joint components together in axially stressed relation;
   a pressure applying means connected in common to said actuating means for moving said plurality of actuating means simultaneously to effect rotation of each tension means into said active locking position thereof;
   an elastically yielding metal sealing ring disposed between said annular surfaces of said components;
   a plurality of housings, each said housing having a respective one of said tension means therein and being movably mounted in said second component coaxially of said second component; and a plurality of wedges, each wedge being slidably disposed between a respective one of said housings and said second component to effect axial movement of said housing in response to radial movement of said wedge inwardly relative to said second component.

2. The combination as set forth in claim 1 wherein each said component has a bore therein coaxially of the bore in the other of said components and said sealing ring is coaxial of and between said bores.

3. The combination as set forth in claim 1 wherein said second component includes a plurality of cavities, each cavity having a respective one of said housings and a respective one of said actuating means therein and which further comprises a plurality of covers, each cover being removably mounted of a respective cavity on an outer surface of said second component.

4. The combination as set forth in claim 1 wherein each actuating means is slidably disposed to effect radial movement of a respective wedge inwardly of said second component after movement of a respective tension means to said active position thereof.

5. The combination as set forth in claim 1 wherein each tension means is rotatably mounted in a respective housing and has a pair of bearing-forming peripheral surfaces slidably disposed in said respective housing.

6. The combination as set forth in claim 1 wherein each tension means has a flat tension face for abutting said stop surface of said first component in said active locking position of said respective tension means.

7. The combination as set forth in claim 6 wherein said flat tension face of a respective tension means is in a plane radial of a pivot axis of said respective tension means.

8. The combination as set forth in claim 6 wherein each tension means has a back face supported on a mating face of a respective actuating means in said active locking position of said respective tension means.

9. The combination as set forth in claim 1 wherein said first component has an annular groove of arcuate shape and each tension means has an outer cylindrical surface for sliding in said groove in mating relation during movement of said respective tension means to said active locking position thereof.

10. The combination as set forth in claim 1 wherein said pressure applying means includes a plurality of cylinders in said second component for receiving pressure medium simultaneously and a plurality of pistons, each piston being slidably mounted in a respective cylinder and being connected to a respective actuating means for moving said respective actuating means in response to pressure medium begin received in said cylinders.

11. The combination as set forth in claim 10 wherein each said cylinder is disposed on an axis angularly disposed relative to a longitudinal axis of said second component.

12. The combination as set forth in claim 1 wherein each tension means is rotatably mounted in a respective housing and has a pair of bearing-forming peripheral surfaces slidably disposed in said respective housing.

13. The combination as set forth in claim 1 wherein said pressure applying means includes a plurality of cylinders in said second component for receiving pressure medium simultaneously and a plurality of pistons, each piston being slidably mounted in a respective cylinder and being connected to a respective actuating means for moving said respective actuating means in response to pressure medium begin received in said cylinders.

14. The combination as set forth in claim 13 wherein each said cylinder is disposed on an axis angularly disposed relative to a longitudinal axis of said second component.

15. In combination, a pair of axially disposed joint components, each said component having an annular surface facing and mating with an annular surface of the other of said components and a first of said components having a stop surface thereon;

an annular array of tension means, each said tension means being rotatably mounted in a second of said components to rotate between an inactive position spaced from said first component and an active locking position engaging said stop surface of said first component to secure said joint components together;

a plurality of actuating means, each said actuating means being slidably movable from a rest position to an extended position to rotate a respective tension means from said inactive position to said active position thereof for pressing said joint components together in axially stressed relation;

a pressure applying means connected in common to said actuating means for moving said plurality of actuating means simultaneously to effect rotation of each said tension means into said active locking position thereof;

each tension means having a flat tension face for abutting said stop surface of said first component in said active locking position of said respective tension means and a back face supported on a mating face of a respective actuating means in said active locking position of said respective tension means; and an elastically yielding metal sealing ring disposed between said annular surfaces of said components.

16. The combination as set forth in claim 15 which further comprises a plurality of housings, each said housing having a respective one of said tension means therein and being movably mounted in said second component coaxially of said second component and a plurality of wedges, each wedge being slidably disposed between a respective one of said housings and said second component to effect axial movement of said housing in response to radial movement of said wedge inwardly relative to said second component.

17. The combination as set forth in claim 16 wherein each actuating means is slidably, disposed to effect radial movement of a respective wedge inwardly of said second component after movement of a respective tension means to said active position thereof.

18. In combination, a pair of axially disposed joint components, each said component having an annular surface facing and mating with an annular surface of the other of said components and a first of said components having a stop surface thereon;

an annular array of tension means, each said tension means being rotatably mounted in a second of said components to rotate between an inactive position spaced from said first component and an active locking position engaging said stop surface of said first component to secure said joint components together;

a plurality of actuating means, each said actuating means being slidably movable; from a rest position to an extended position to rotate a respective tension means from said inactive position to said active position thereof for pressing said joint components together in axially stressed relation;

a pressure applying means connected in common to said actuating means for moving said plurality of actuating means simultaneously to effect rotation of each said tension means into said active locking position thereof;

a plurality of housings, each said housing having a respective one of said tension means therein and being movably mounted in said second component coaxially of said second component; and a plurality of wedges, each wedge being slidably disposed between a respective one of said housings and said second component to effect axial movement of said housing in response to radial movement of said wedge inwardly relative to said second component.

19. The combination as set forth in claim 18 wherein each actuating means is slidably disposed to effect radial movement of a respective wedge inwardly of said second component after movement of a respective tension means to said active position thereof.

20. The combination as set forth in claim 18 wherein each tension means is rotatably mounted in a respective housing and has a pair of bearing_forming peripheral surfaces slidably disposed in said respective housing.

* * * * *

UNITED STATES PATENT AND TRADEMARK OFFICE
CERTIFICATE OF CORRECTION

PATENT NO. : 5,658,018
DATED : August 19, 1997
INVENTOR(S) : OLE HJERTHOLM

It is certified that error appears in the above-identified patent and that said Letters Patent is hereby corrected as shown below:

Column 1, line 40 cancel ".".
    Line 59 change "sea"" to -se a-
    Line 61 cancel "is"

Column 11, line 47 change "Slide" to -slide-

Column 14, line 19 begin a new paragraph with "A plurality of wedges"

Column 16, line 8 cancel ","

Signed and Sealed this

Twentieth Day of January, 1998

Attest:

BRUCE LEHMAN

Attesting Officer      Commissioner of Patents and Trademarks